United States Patent [19]
Fukumura et al.

[11] Patent Number: 5,674,556
[45] Date of Patent: Oct. 7, 1997

[54] METHOD FOR PRODUCING A SHEET-LIKE PLATE

[75] Inventors: Kenichi Fukumura; Yoshiaki Noda, both of Minami-ashigara, Japan

[73] Assignee: Fuji Photo Film Co., Ltd., Kanagawa, Japan

[21] Appl. No.: 688,695

[22] Filed: Jul. 29, 1996

Related U.S. Application Data

[63] Continuation of Ser. No. 258,664, Jun. 10, 1994, abandoned.

[30] Foreign Application Priority Data

Jun. 15, 1993 [JP] Japan ................. 5-143531

[51] Int. Cl.$^6$ ................................ B05D 5/12
[52] U.S. Cl. .............. 427/113; 427/122; 427/123; 427/126.2; 427/126.3; 427/434.2; 427/436; 427/443.2
[58] Field of Search ............... 427/113, 122, 427/123, 126.2, 126.3, 434.2, 436, 443.2

[56] References Cited

U.S. PATENT DOCUMENTS

| | | | |
|---|---|---|---|
| 3,951,688 | 4/1976 | Pankow et al. | 136/67 |
| 4,332,840 | 6/1982 | Tanaka et al. | 427/130 |
| 5,316,556 | 5/1994 | Morris | 29/623.3 |

FOREIGN PATENT DOCUMENTS

| | | |
|---|---|---|
| 3126795 | 6/1982 | Germany . |
| 184069 | 7/1989 | Japan . |
| WO9422659 | 10/1994 | WIPO . |

OTHER PUBLICATIONS

Patent Abstracts of Japan, Abstract of JP-A-63-95444, Jan.-90.
Patent Abstracts of Japan, Abstract of JP-A-4-282558, Oct.-92.
Patent Abstracts of Japan, Abstract of JP-A-61-98921, Apr.-88.
Patent Abstracts of Japan, Abstract of JP-A-2-164480, Jun.-90.
Patent Abstracts of Japan, Abstract of JP-A-1-180267, Jul.-89.

*Primary Examiner*—Bernard Pianalto
*Attorney, Agent, or Firm*—Sughrue, Mion, Zinn, Macpeak & Seas, PLLC

[57] ABSTRACT

There is disclosed a method for producing a sheet-like electric cell plate and an electrochemical cell produced by using the plate. The sheet-like electric cell plate is produced by a method which comprises discharging an electrode material coating solution from an extrusion-type slot die and coating the solution onto an electrically-conductive support running around a backup roll. The electrochemical cell comprises a positive electrode plate, a negative electrode plate, both of which plates are produced by the above method, and an electrolyte.

18 Claims, 8 Drawing Sheets

METHOD FOR PRODUCING A SHEET-LIKE PLATE

This is a Continuation of application Ser. No. 08/258,664 filed Jun. 10, 1994, now abandoned.

FIELD OF THE INVENTION

The present invention relates to a method for producing a sheet-like electric cell plate (hereinafter referred to as a "sheet-like plate") that renders the production fluctuation of discharge capacity of the cell small and improves the cycle life of repeating discharge and recharge of two or more cells connected in series, parallel, or both of them; and relates to an electrochemical cell using the above sheet-like plate.

BACKGROUND OF THE INVENTION

In nonaqueous electrolyte cells, since the electric conductivity of the nonaqueous electrolyte used therein is low in comparison with the electrolyte of aqueous electrolyte cells, it is required to reduce the thickness of the electrode layer formed on the electrically-conductive support. In cylindrical electrochemical cells, to increase the filling amount of the electrode-active material, a volute structure having a sheet-like electrode rolled in a volute fashion is used.

Conventionally, as a method for the production of a sheet-like plate, a milling or rolling process is used. That is, an electrically-conductive agent, a binder, etc., are mixed and kneaded with an electrode-active material and the mixture is milled between pressure rolls and filled forcibly into a support, to form a sheet-like plate. There are also suggested a method wherein the mixture kneaded is extruded onto both sides of a support (as described in JP-A ("JP-A" means unexamined published Japanese patent application) No. 282558/1992), methods of pulling-up the mixture (as described in JP-A Nos. 256365/1987 and 114058/1988), and methods of pulling-down the mixture (as described in JP-A Nos. 267953/1989 and 194265/1989). Although these methods are efficient because both sides of the support are simultaneously coated, there are such problems that it is difficult to place the support at the center of the plate sheet, and that a thin sheet cannot be made.

As a method for the production of a sheet-like plate, a roll coating method, wherein multiple rolls are combined and a coating mixture is passed through the gap between the rolls and is applied on a support, is suggested, and examples thereof are a reverse roll coating method and a gravure roll coating method. However, in these roll coating methods, ribbings (ridges) and a surface appearance called unevenness are observed, and it is difficult to make the sheet-like plate smooth.

A doctor blade coating method disclosed, for example, in JP-A Nos. 184069/1989, 194265/1989, and 242071/1992, is suggested as a method for the production of a thin sheet-like plate. That is, a doctor blade is placed, with a prescribed clearance between it and the surface of a support to be coated. An electrode-active material is mixed with an electrically-conductive agent, and a binder, etc., are added thereto; then they are kneaded, to make an electrode material coating solution. Then the coating solution is stored in front of the doctor blade, and an amount of the electrode material coating solution corresponding to the clearance between the blade and the running support is pulled out as a layer on the support, to produce a sheet-like plate.

Although it is possible to make a thin sheet-like plate by the doctor blade coating method, since the coating is carried out with the coating solution stored in front of the doctor blade, the solvent evaporates during the coating and the concentration of the coating solution changes with time. Since along with the change in the concentration of the coating solution the physical properties of the coating solution change, it is difficult to carry out the coating stably.

In the doctor blade method as suggested in JP-A No. 242071/1992, since a coating solution stored in front of a doctor blade is fed onto an electrically-conductive support continuously, when joined parts of supports are passed, it is required that the application of the stored coating solution is completed before the passage of the joined parts. After the passage of the joined parts, the supply of the coating solution is resumed, but the application cannot be carried with the intended application width secured until the position in front of the doctor blade is filled with the coating solution. There are such problems that it is difficult to carry out the start and the termination of the application at will, and that simultaneous coating of both sides of the support is impossible.

As the coating method, there is an extrusion coating method. The extrusion method is a method wherein a coating solution is fed to a slot die and is discharged from the slot nozzle on a running support. In the extrusion method, the coating amount can be regulated by setting the discharge amount by means of a steady-flow pump, and, since the coating solution is scarcely exposed to the atmosphere, a change in concentration of the coating solution due to evaporation of the solvent does not take place. In some cases the slot nozzle is placed in opposition to a backup roll by interposing the support (as described in JP-A Nos. 17661/1981, 19060/1982, 180267/1989, and 164480/1990), and in some other cases a backup roll or a plate is not placed in opposition to the slot nozzle by interposing a support (JP-A Nos. 150866/1985, 95169/1987, and 4071/1992), which types of aforementioned cases are suggested in the fields of photographic films, printing plate materials, and magnetic recording materials. The present invention is an application to the production of an electrode sheet by the extrusion coating method.

SUMMARY OF THE INVENTION

The object of the present invention is to provide a method for producing a sheet-like plate that makes small the production fluctuation of discharge capacity of an electrochemical cell and improves the cycle life of repeating discharge and recharge of connected single electrochemical cells.

Another object of the present invention is to provide an electrochemical cell having a small production fluctuation of discharge capacity and an improved cyclic life of repeating discharge and recharge of two or more connected single cells.

Other and further objects, features, and advantages of the invention will appear more evident from the following description, taken in connection with the accompanying drawings.

DETAILED DESCRIPTION OF THE INVENTION

Since the coating of an electrode material is usually thick (for example, 30 to 1,000 μm in terms of thickness in wet state) and the drying load is large, it is required to lower the coating speed. If coating is carried out by using an extrusion-type slot die to attain the above-mentioned coating thickness, especially at low coating-speed less than 10 m/min, liquid sags may occur in the case of coating of photographic films, or streaks by aggregates may occur in the case of coating of magnetic recording materials. The present inventors have keenly studied on the coating of electrode materials and have found surprisingly that without causing the above problems of liquid sags or streaks by aggregates, satisfactory electrode materials coated could be obtained by using an extrusion-type slot die with a backup roll on the opposite side of a support and by using a coating solution for the electrode material having viscosity in the range of 0.5 to 500 Pas.

The object of the present invention has been attained by providing a method for producing a sheet-like electric cell plate of an electrochemical cell comprising a positive electrode, a negative electrode, and an electrolyte, which comprises discharging an electrode material coating solution from an extrusion-type slot die having a slot nozzle, and coating the solution onto an electrically-conductive support running around a backup roll.

The extrusion-type slot die for use in the present invention has a slot, formed by two opposing lips that have a clearance between them, and a solution well, connected to the slot and placed in the slot die. A coating solution is quantitatively supplied into the solution well by a solution-supply arrangement placed outside the slot die. Then, through the connected slot, the coating solution is discharged from the slot nozzle. The slot nozzle is arranged with a clearance kept between it and a running support, and the coating solution discharged from the slot nozzle is applied as a layer onto the support.

An embodiment of the present invention is described in detail with reference to the accompanying drawings.

Figure 1:
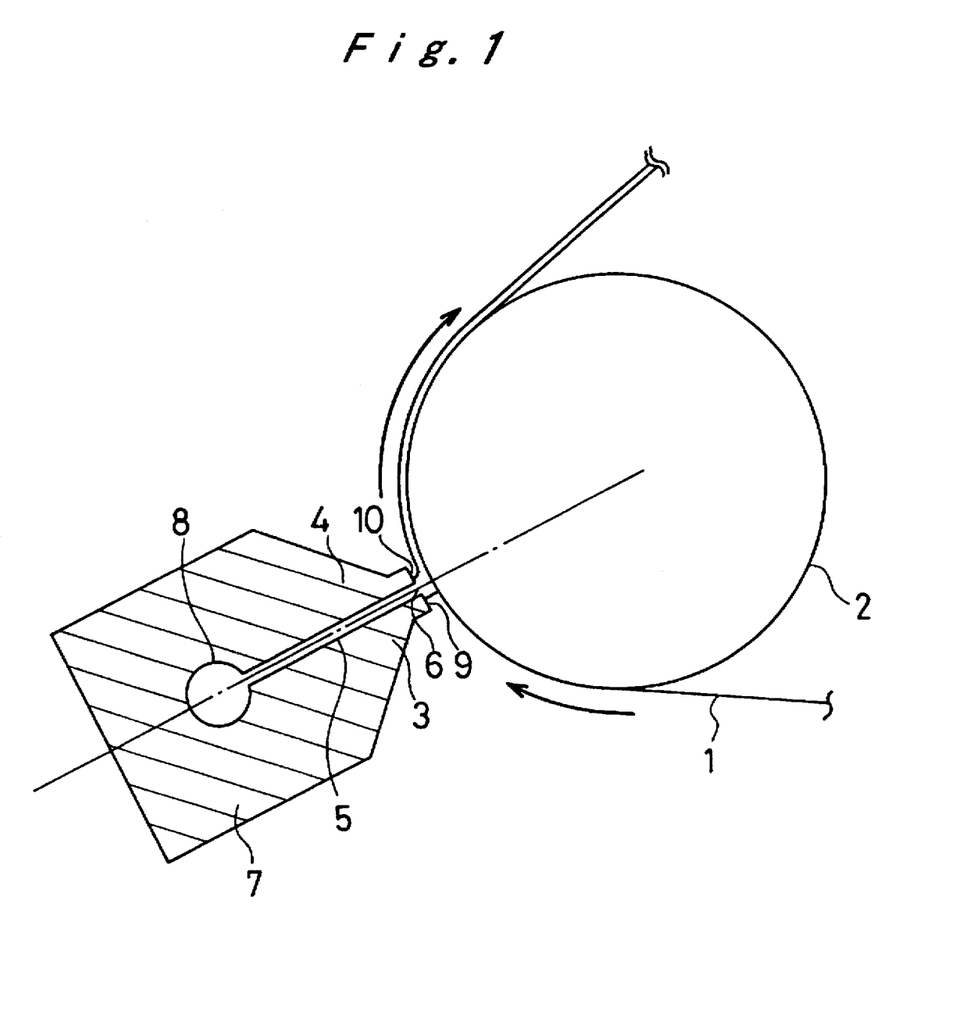
FIG. 1 is an end view, in which a slot die is cross-sectioned, which shows an essential part of a coating apparatus for use in the present invention.

FIG. 1 is an end view of the coating apparatus (application apparatus), i.e., the embodiment of the production method according to the present invention, but the present invention is not restricted to this mode. In FIG. 1, a slot die is shown as a cross-sectional view. In FIG. 1, an electrically-conductive support 1 (hereinafter referred to as "the support") is continuously run around the surface of a rotating backup roll 2, with the support 1 in close contact with the backup roll 2. A slot die 7 is placed so as to allow a slot nozzle 6 and the backup roll 2 to have a clearance for the support between them. The slot die 7 comprises a slot 5, which slot is formed by an inlet side lip 3 and an outlet side lip 4, which side lips are respectively located on the inlet side lip surface 9 and outlet side lip surface 10 of the support 1; and a coating solution well 8 that is in connection with the slot 5.

Figure 2:
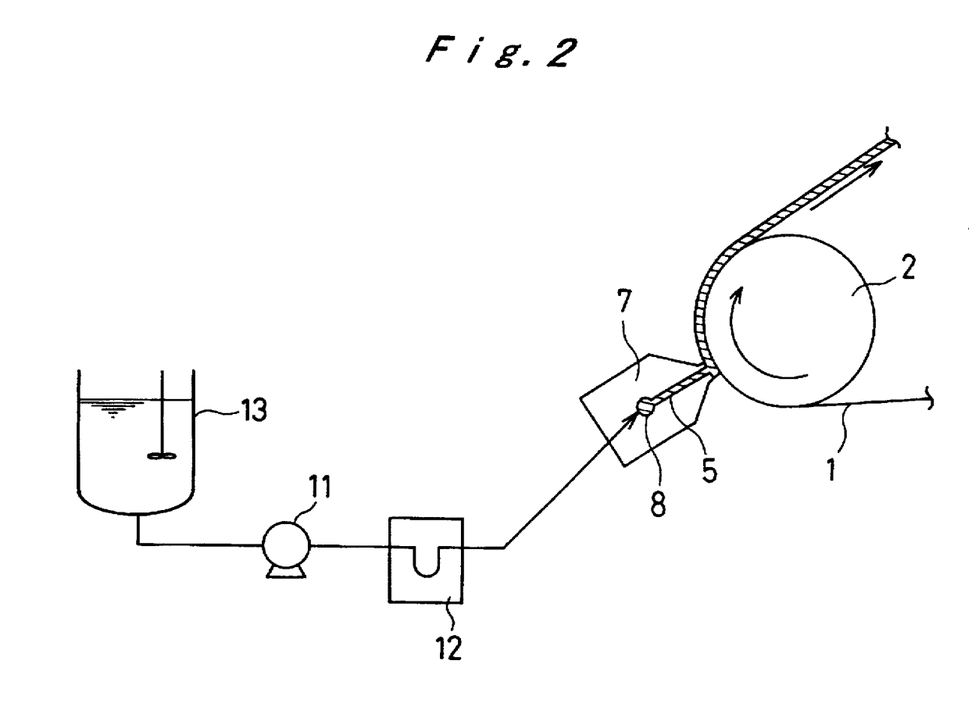
FIG. 2 shows a flow diagram of the supply of a coating solution for use in the present invention.

FIG. 2 shows a flow diagram of the electrode material coating solution (hereinafter referred to as "coating solution") supply. The coating solution prepared is continuously fed from solution tank 13 to the solution well 8 in the nozzle 7 by a suitable steady-flow supply apparatus 11, for example a steady-flow pump, through a flowmeter 12. The coating solution supplied from the solution tank 13 is fed to the solution well 8 in the slot die 7 through a path (not shown) which connects the solution well 8 and a line from the solution tank 13. The coating solution is passed through slot 5 by the solution well 8 and is discharged from the slot nozzle 6 onto the support 1, which is continuously run. Since the coating well 8 has a function to buffer the change of feeding rate of the coating solution, the coating solution is discharged uniformly. The backup roll effects to keep the space between the slot die outlet and the support constant and to maintain the uniform transportation speed of the support.

In the above coating method, the viscosity of the coating solution is desirably in the range of 0.5 to 500 Pas, preferably in the range of 0.6 to 100 Pas, more preferably 0.7 to 50 Pas, as measured at 25° C. by a Brookfield-type viscometer (e.g., one manufactured by TOKIMEC KK).

Figure 3:
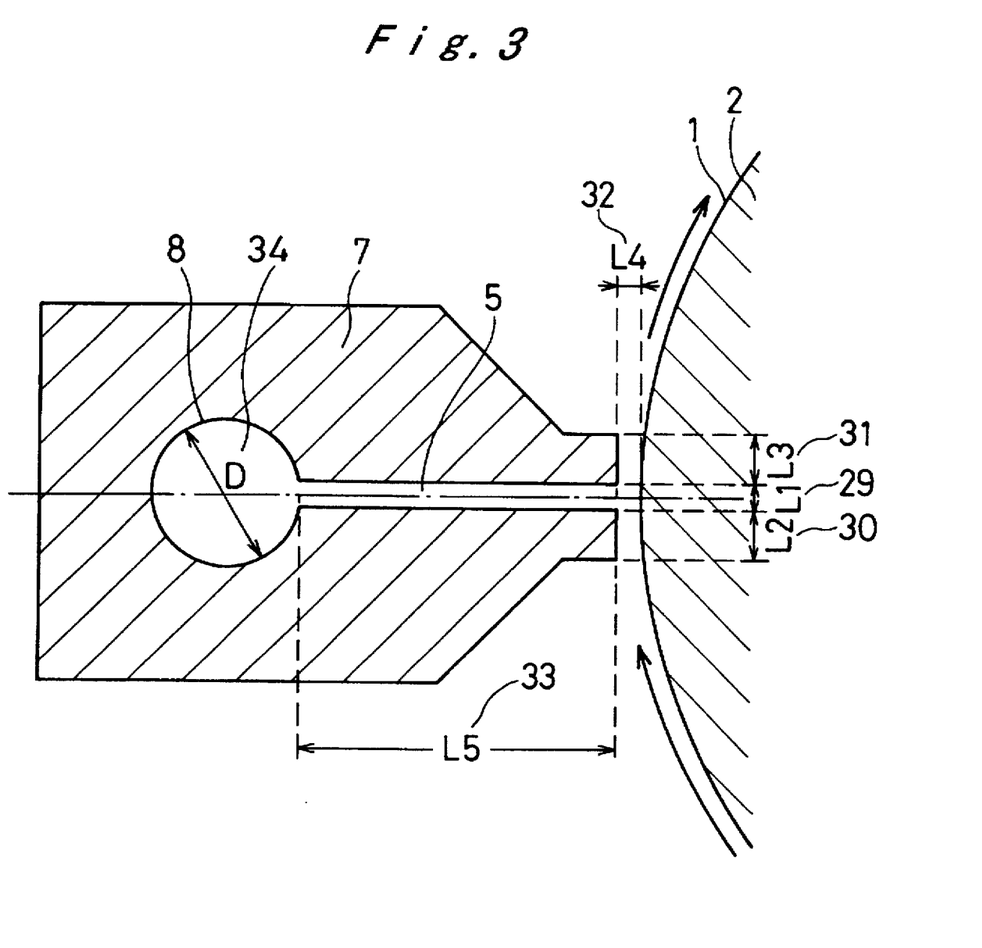
FIG. 3 is a cross-sectional view which shows the constitution of an essential part of a coating apparatus for use in the present invention.

As is shown in FIG. 3, the slot clearance 29 (L1) of the slot die 7 for use in the present invention is determined depending on the liquid physical properties of the coating solution, the coating thickness, and the like; and this clearance is not particularly restricted, but it is preferably in the range of 0.1 to 2 mm, particularly preferably 0.3 to 1 mm.

The width 30 (L2) of the lip surface 9 on the support inlet side of the slot die 7 for use in the present invention (herein the term "width of the lip surface" refers to the projected width against the tangent at the slot for the backup roll) is preferably in the range of 0.2 to 5 mm, particularly preferably 0.3 to 3 mm.

Further, the width 31 (L3) of the lip surface 10 on the support outlet side of the slot die 7 for use in the present invention (herein the term "width of the lip surface" has the same meaning as the defined above width 30) is preferably in the range of 0.2 to 5 mm, particularly preferably 0.3 to 3 mm.

The space 32 (L4) between the slot die outlet 6 and the support 1 for use in the present invention (herein the term "space" refers to the smaller distance of the shortest distance between the inlet side lip surface 9 and the support 1 and the shortest distance between the outlet side lip surface 10 and the support 1) is not particularly restricted, but it is preferably in the range of 0.1 to 3 mm, particularly preferably 0.3 to 1 mm.

Further, the slot length 33 (L5) of the slot 5 in the slot die 7 for use in the present invention is not particularly restricted, but it is preferably in the range of 10 to 200 mm, particularly preferably 20 to 150 mm.

The shape of the cross section of the solution well 8 of the slot die 7 for use in the present invention is not particularly restricted, as long as the shape does not make the coating solution stagnant, and if the shape of the cross section is circular, the inner diameter 34 (D) is preferably in the range of 5 to 100 mm, particularly preferably 10 to 50 mm.

Figure 4A:
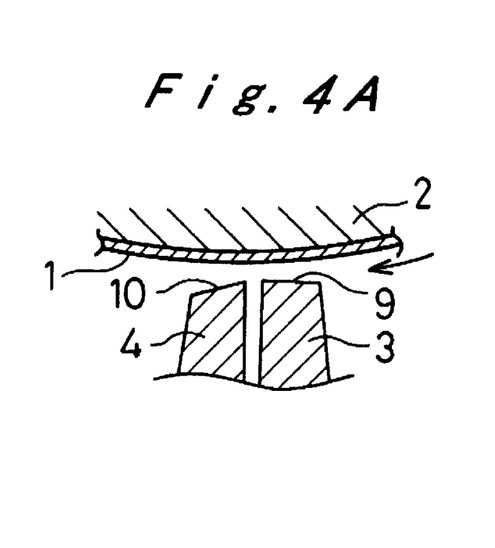
FIGS. 4A, 4B, 4C, 4D, 4E, and 4F are enlarged cross-sectional views which show the shapes of slot die lips for the present invention.
Figures 4B, 4C, 4E, 4F:
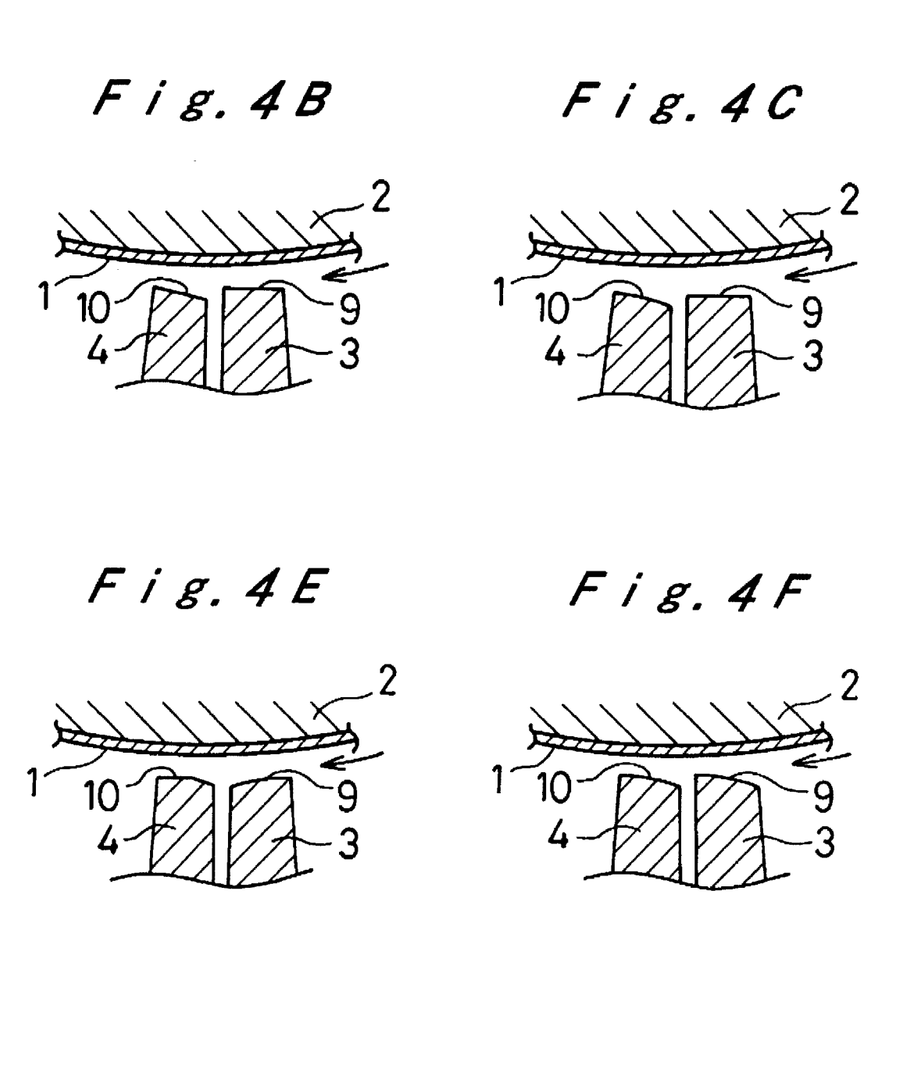
Figure 4D:
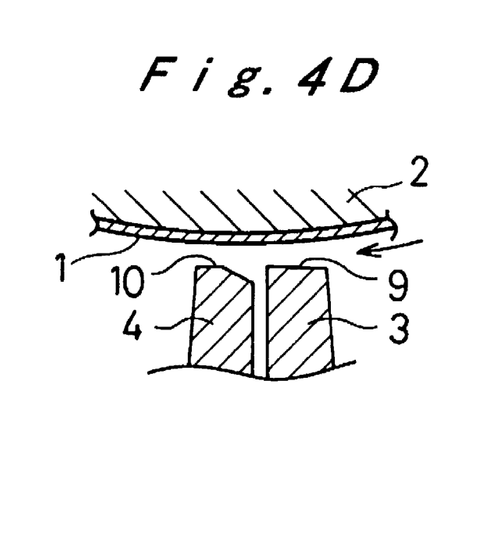

Each shape of the inlet side lip surface 9 and the outlet side lip surface 10 of the slot die 7 for use in the present invention is not particularly restricted, and it may be a plane, a combination of planes, a curve shaped, or a combination of a curve shaped with a plane, with particular preference given to a plane and a combination of planes. As combination of the shapes of the inlet side lip surface 9 and the outlet side lip surface 10, for example, a plane 9 and anther plane 10 (FIGS. 4A and 4B), a curve shaped 10 and a plane 9 (FIG. 4C), a combination of planes 10 and another plane 9 (FIG. 4D), a combination of planes 10 and a curve shaped 9 (FIG. 4E), a curve shaped 9 and another curve shaped 10 (FIG. 4F), can be mentioned, but they are not restricted to those. The outlet side lip surface 10 may be a plane having a notched part at the side of slot die outlet 6 (FIG. 4D and FIG. 4E). Examples of the shape of the lip surfaces and the combination thereof are shown in FIGS. 4A to 4F, but they are not restricted to them.

Figure 5A:
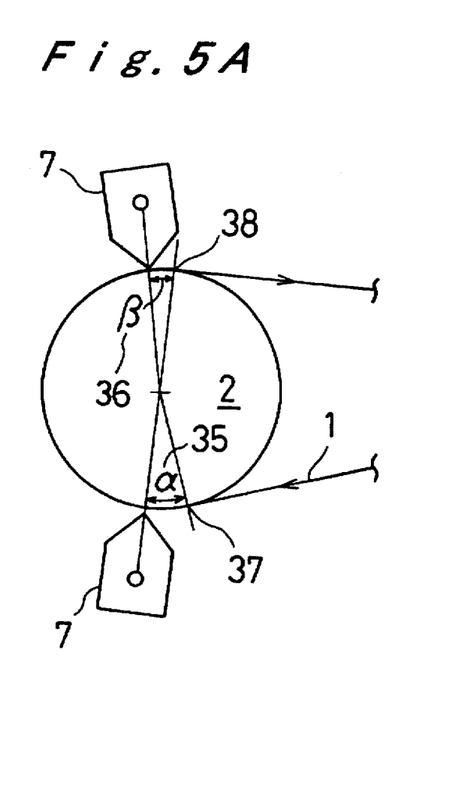
FIGS. 5A, 5B, and 5C show schematically the positions of coating apparatuses.
Figure 5B:
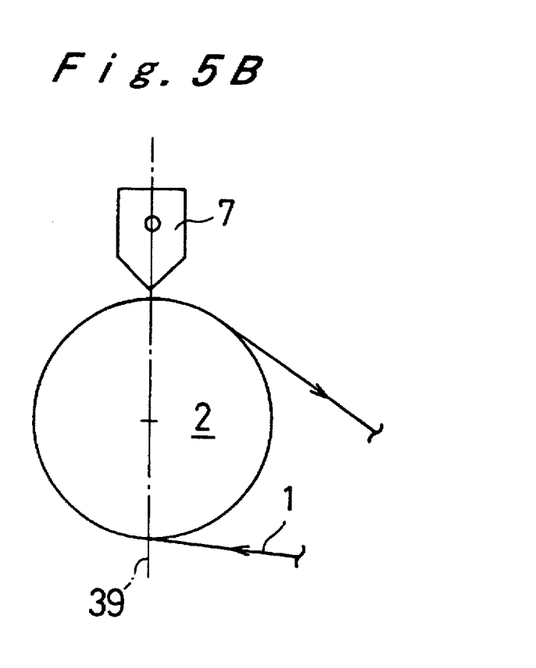
Figure 5C:
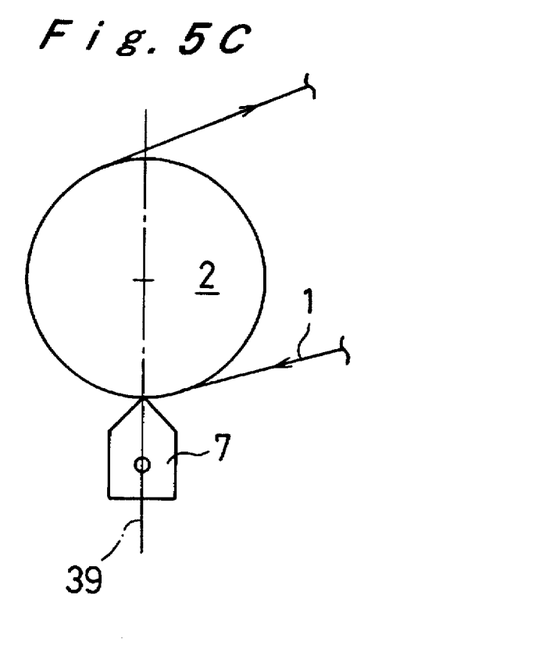

As is shown in FIGS. 5A, 5B, and 5C, the position of the slot die 7 for use in the present invention relative to the backup roll 2 is not particularly restricted, and the slot die 7 can be positioned at any place as long as the support 1 is wound closely around the backup roll 2. The preferable position of slot die 7 is described in accordance with FIG. 5A, in which an example of two slot dies 7 and 7 on a backup roll 2 are shown for explaining angles α and β. The central angle 35 (α), between the point 37 at which the support 1 starts to be wound around the backup roll 2 and the position where the slot die 7 is directed to the wound running support 1, and the central angle 36 (β), between the point 38 at which the support 1 stops being wound around the backup roll 2 and the position where the slot die 7 is directed to the running leaving support 1, are preferably 3° or over, particularly preferably 5° or over. In the above range, the slot die 7 may be positioned at any place over the backup roll 2 (FIG. 5B) or below the backup roll 2 (FIG. 5C) assuming that the slot die 7 lies on a vertical line 39 passing through the center of the backup roll 2.

The transportation speed of the support in the present invention is not particularly restricted, but the speed is preferably in the range of 0.1 to 100 m/min, particularly preferably 0.1 to 50 m/min.

The amount of the coating solution to be fed to the slot die for use in the present invention is determined depending, for example, on the thickness of the coating layer and the transportation speed of the support, and the average flow velocity (the feed flow velocity/the slot cross-sectional area) in the slot is preferably in the range of 0.1 cm/min to 100 m/min, particularly preferably 0.5 cm/min to 30 m/min.

The coating thickness of the coating solution to be applied in accordance with the present invention is preferably in the range of 10 to 2,000 µm, particularly preferably 100 to 1,000 µm, in terms of the wet state before drying. The coating thickness of the coating solution after drying is preferably in the range of 5 to 1,800 µm, particularly preferably 15 to 900 µm.

As the material of the slot die for use in the present invention, for example, a metal, an alloy, a material containing at least a metal, a ceramic, or a plastic can be used, and if the coating solution is corrosive, a corrosion-resistant material is chosen.

The temperature of the coating solution to be supplied to the slot die for use in the present invention can be controlled as required. The temperature of the coating solution is preferably in the range of 10° to 60° C., particularly preferably 15° to 45° C.

Figure 6:
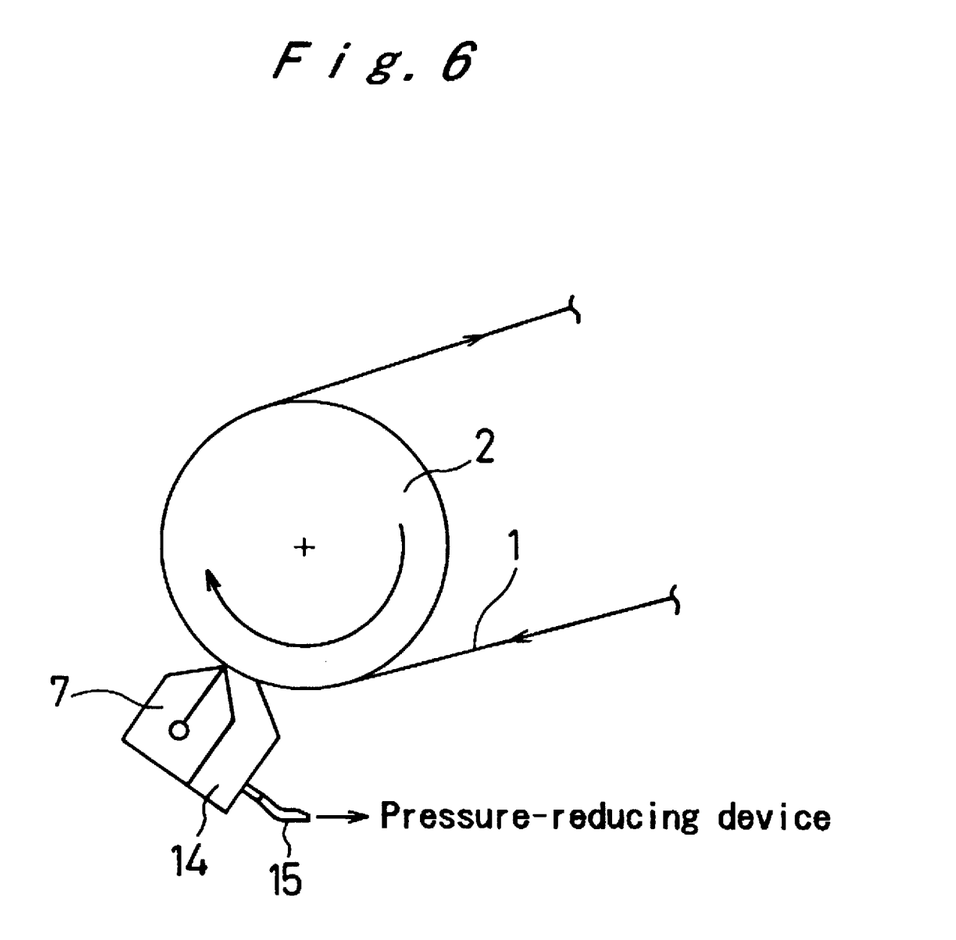
FIG. 6 shows schematically a coating apparatus provided with a vacuum chamber for use in the present invention.

As is shown in FIG. 6, in the present invention, a vacuum chamber 14 can be provided on the slot die inlet side to seal up space among the slot die 7 and the support 1, when the coating speed is high or the coating layer is thin or the physical properties of the coating solution require it. The vacuum chamber 14 is in the shape of a box, and a conduit 15 is connected to a pressure-reducing device (not shown), so that the pressure in the vacuum chamber 14 is kept at in the range of 0 to 300 mm $H_2O$.

Figure 7A:
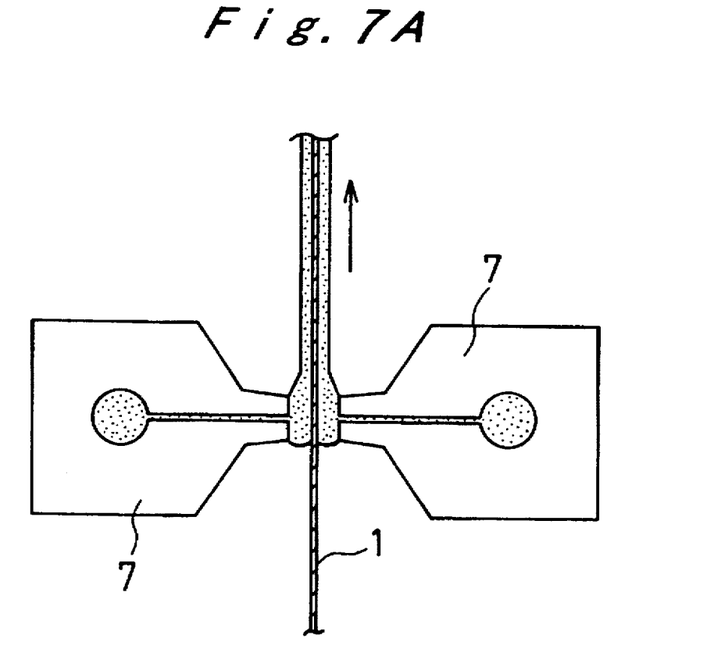
FIGS. 7A and 7B show schematically simultaneous-coating apparatuses for both sides of a support.
Figure 7B:
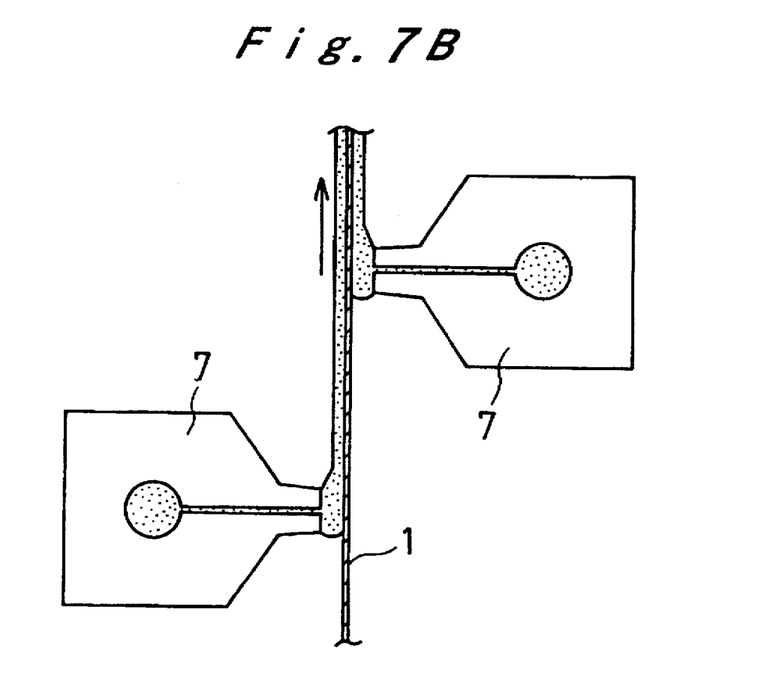

Examples of coating apparatus having no backup roll are shown in FIGS. 7A and 7B for reference. The examples show embodiments different from that of the present invention. As is shown in FIGS. 7A and 7B, slot dies 7 and 7 may be placed on opposite sides of the support 1, with a clearance between the support 1 and them, in which case the slot dies 7 and 7 may be placed in opposition to each other (FIG. 7A), or they may be placed away from each other (FIG. 7B). Although the opposite surfaces of the support can be coated with electrode material simultaneously in the above manner, since no backup roll is used, the clearance between the support and slot dies fluctuates, therefore, unevenness of coating thickness occurs.

The coating solution to be applied in accordance with the present invention can contain an electrode-active material, an electrically-conductive agent, a binder, a solvent, etc.

As the electrode-active material, any compound can be used if the compound can insert and/or release $H^+$, $Li^+$, $Na^+$, or $K^+$, and in particular a transition metal oxide, a transition metal chalcogenide, a carbonaceous material, or a semimetal oxide whose semimetal composes mainly IVB, VB group semimetal in the periodic table can be used, with particular preference given to a lithium-containing transition metal oxide, a transition metal oxide, a carbonaceous material, or a semimetal oxide whose semimetal composes mainly IVB, VB group semimetal in the periodic table (the transition metal comprises preferably mainly Mn, Co, Ni, V, or Fe, the IVB or VB group semimetal in the periodic table comprises preferably mainly Ge, Sn, Pb, Bi, or Si). Specific examples are $LiCoO_2$, $LiNiO_2$, $LiCo_{0.5}Ni_{0.5}O_2$, $LiMn_2O_4$, $LiCoVO_4$, $LiNiVO_4$, $LiCo_{0.9}Sn_{0.1}O_2$, $LiCo_{0.9}Ti_{0.1}O_2$, $LiCo_{0.9}Al_{0.1}O_2$, $LiCo_{0.9}In_{0.1}O_2$, $LiCo_{0.9}Y_{0.1}O_2$, $LiCo_{0.9}Ce_{0.1}O_2$, $Fe_3O_4$, $V_6O_{13}$, $V_2O_5$, and the like. A preferable carbonaceous material is one in which the spacing between the 002 planes is in the range of 3.35 to 3.80 Å (angstroms) and the density is in the range of 1.1 to 1.7 g/cm³, and as examples thereof graphite, petroleum coke, carbon obtained by baking cresol resin, carbon obtained by baking furan resin, carbon obtained by baking polyacrylonitrile fiber, pyrolytic carbon, and carbon obtained by baking mesophase pitch can be mentioned. Specific examples of the semimetal oxide whose semimetal comprises mainly IVB, VB group semimetal in the periodic table are GeO, $GeO_2$, SnO, $SnO_2$, PbO, $PbO_2$, $Pb_2O_3$, $Pb_3O_4$, $Sb_2O_3$, $Sb_2O_4$, $Sb_2O_5$, $Bi_2O_3$, $Bi_2O_4$, $Bi_2O_5$, $SiSnO_3$, $Li_2SiO_3$, $Li_4SiO_4$, $Li_2Si_3O_7$, $Li_2Si_2O_5$, $Li_8SiO_5$, $Li_6Si_2O_7$, $Li_4Ge_9O_2$, $Li_6Ge_8O_{19}$, $Li_4Ge_5O_{12}$, $Li_6Ge_2O_7$, $\alpha$-$Li_4GeO_4$, $Li_4GeO_4$, $\beta$-$Li_8GeO_5$, $Li_2Ge_7O_{15}$, $Li_2GeO_3$, $Li_2Ge_4O_9$, $Li_2SnO_3$, $Li_8SnO_6$, $Li_2PbO_3$, $\beta$-$Li_2PbO_3$, $Li_8PbO_6$, $Li_4PbO_4$, $Li_7SbO_6$, $LiSbO_3$, $Li_3SbO_4$, $Li_3BiO_4$, $Li_7BiO_6$, $Li_5BiO_5$, $LiBiO_2$, $Li_4Bi_6O_{11}$, $Li_4MgSn_2O_7$, $Li_2MgSn_2O_5$, $Li_2Mg_3SnO_6$, $Li_2Mg_3SnO_6$, $Li_4Mg_2SnO_6$, and the like, but the semimetal oxide is not restricted to those. The coating solution employed in the present invention may comprises an electrode-active material whose grain diameter is in the range of 0.01 to 100 µm.

As the electrically-conductive agent, any electron-conductive material that does not cause any chemical change in the constructed cell can be used, and generally the conductive agent comprises one of electron-conductive materials, such as natural graphite (e.g., flaky graphite and crystalline graphite), artificial graphite, carbon black, acetylene black, Ketjen black, carbon fiber, a metal powder, a metal fiber, and a polyphenylene derivative, or a mixture of these. A combination of graphite and acetylene black is particularly preferable.

As the binder, at least one of polysaccharides, thermoplastic resins, and polymers having rubber elasticity, or a mixture of them, can be used. The binder may be dissolved in the solvent or it may be present as a solid in the solvent to form, for example, a dispersion or suspension.

As the solvent, water or at least one of organic solvents, or a mixture of water and at least one of organic solvents can be used. There are no particular restrictions on the solvent, and, for example, N-methylpyrrolidone, xylene, toluene, acetone, methyl ethyl ketone, methyl isobutyl ketone, cyclohexanone, ethanol, methanol, methyl acetate, ethyl acetate, butyl acetate, methylene chloride, and ethylene chloride are preferable.

The composition of electrode material coating solution is not restricted to particular one, but the coating solution comprises generally 100 parts by weight of electrode-active material, 1 to 50 parts by weight of electrically-conductive agent, 0.1 to 50 parts by weight of binder, and 3.0 to 600 parts by weight of solvent.

There are no particular restrictions on the electrically-conductive support in the present invention, and, as the electrically- conductive support, a metallic foil (e.g., aluminum, copper, nickel, and stainless steel) and an electrically- conductive film, for example, of an inorganic oxide, an organic polymer material, or carbon, can be used. The support may be in a continuous form, a perforated form, or a net form, with particular preference given to a continuous form. Preferably the thickness of the electrically-conductive support is in the range of 1 to 200 μm.

Further, the tension exerted on the support at the coating in the present invention is not particularly restricted, but the tension is preferably in the range of 10 to 500 g/cm, particularly preferably 20 to 300 g/cm.

In the present invention, if the position of the support on the backup roll fluctuates considerably, the running position of the support is controlled by, for example, an EPC (edge position controller) placed on the support-entering side of the backup roll.

Figure 8:
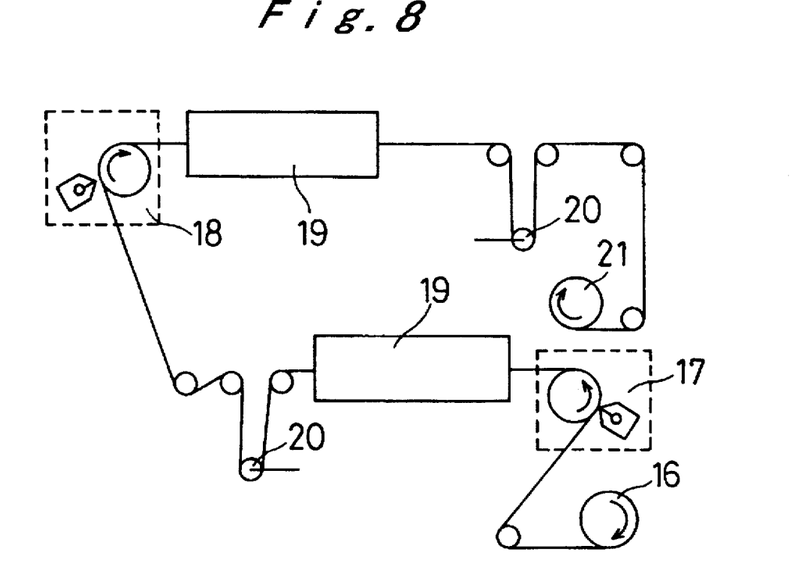
FIG. 8 is a flow diagram which shows overall of the steps for producing a sheet-like plate, which steps comprise coating apparatuses for use in the present invention.

As is shown in FIG. 8, when the both sides of the support are individually coated successively, one side of the support 1 is coated at a coating apparatus 17, and the support is carried into a drying zone 19. Then the opposite side of the support is coated at a coating apparatus 18, followed by drying in a drying zone 19. In the FIG. 8, reference numeral 16 represents a delivery roll for the support 1 which is not coated yet, 21 represents a winding roll for the coated support 1, and 20 and 20 represent tension-controlling rolls. In the drying, for example, hot-air drying or far-infrared rays can be used, and in the hot-air drying, the temperature is chosen depending on the solvent and the binder, and the temperature is desirably in the range of 40° to 250° C., particularly desirably 50° to 200° C. If the moisture cannot be removed satisfactorily by the above drying, a dehydration step can be further provided. In the dehydration step, vacuum drying, far-infrared rays, high-temperature drying, or a combination of these can be used.

The electrochemical cell may be in the shape of a coin, a button, a cylinder, or a box.

In the production of an electrochemical cell utilizing the positive electrode sheet and the negative electrode sheet according to the present invention, as the separator between the positive and negative electrode sheets, for example, a polyethylene, a polypropylene, such as a microporous polypropylene film, and a grass fiber can be mentioned. As the electrolytic solution, for example, a solution which composes at least one aprotic organic solvent as organic solvent (such as propylene carbonate, ethylene carbonate, buthylene carbonate, dimethyl carbonate, diethyl carbonate, γ-butyrolactone, 1,2-dimethoxyethane, and mixture thereof) and at least one lithium salt which is soluble to the organic solvent (such as $LiClO_4$, $LiBF_4$, $LiPF_6$, $LiCF_3SO_3$, $LiCF_3CO_2$, and $LiAsF_6$) can be mentioned. Among the above electrolyte solutions, the electrolyte solution composing $LiCF_3SO_3$, $LiClO_4$, $LiBF_4$, and/or $LiPF_6$ in the mixture of propylene carbonate or ethylene carbonate, and 1,2-dimethoxyethane and/or diethyl carbonate is preferable.

The sheet-like electric cell plate produced by the method of the present invention can be used in primary electric cell and secondary electric cell. That is, the present invention is also applied to primary electrical cells.

When the production method of the present invention is used, the production fluctuation of the discharge capacity of cylindrical cells can be made small, and in the case of multiple cells connected in series, parallel, or both, the connected multiple cells are hardly overdischarged or overcharged, so that the cycle life of the connected multiple cells can be improved. Since a discharge capacity of cells whose production fluctuation is small can be obtained, the yield of the production is improved, it is not required to check all of the cells for selection, and the production can be made efficient.

The present invention will now be described with reference to the following examples in detail, but the present invention is not limited to the following examples as long as the scope of the gist of the invention is observed. The term "parts" as used in the following Examples means parts by weight.

EXAMPLE 1

$LiCoO_2$, as a positive-electrode-active material, and acetylene black, as an electrically-conductive agent, were mixed in a ratio of 88 parts to 9 parts; then 3 parts of polyvinylidene fluoride, as a binder, was added, and N-methylpyrrolidone, as a solvent, was added with the amount to attain the below solid content. The resulting mixture was kneaded, to form a slurry, and the slurry was applied to one surface of an aluminum foil of thickness 20 μm, and then to the other surface using a production steps comprising coating apparatus as shown in FIG. 8, in accordance with the present invention. The coating was carried out with the space between the slot die outlet and the support being 0.5 mm, the slot clearance being 0.5 mm, the width of the inlet side lip surface and the outlet side lip surface being 2 mm, and the support transportation speed being 1 m/min. The solid content and the apparent viscosity of the slurry of the electrode material coating mixture were 60 wt % and 1 Pas, respectively. After the coated product was dried with hot air, it was compression-molded by a roller press to form a positive electrode sheet of thickness 370 μm.

$LiCoVO_4$ (obtained by baking lithium carbonate, cobalt oxide, and vanadium pentoxide in air at 1,000° C. for 24 hours), as a negative-electrode-active material, acetylene black and graphite, as an electrically-conductive agent were mixed in a ratio of 85:6:6 in terms of parts; then 3 parts of a copolymer compound of ethyl acrylate, ethylene, and maleic anhydride, as a binder, was added, and then toluene, as a solvent, was added. The resulting mixture was kneaded, to form a slurry, and the slurry was applied to one surface of a copper foil of thickness 20 μm, and then to the other surface, in a similar manner to that used for the positive electrode, in accordance with the present invention. The space between the slot die outlet and the support was 0.5 mm, the slot clearance was 0.5 mm, the width of the inlet side lip surface and the outlet side lip surface was 2 mm, and the transportation speed of the support was 1 m/min. The solid content and the apparent viscosity of the slurry of coating mixture were 50 wt % and 1 Pas, respectively. After the coated product was dried, it was compression-molded by a roller press, to form a negative-electrode sheet of thickness 220 μm.

Figure 9:
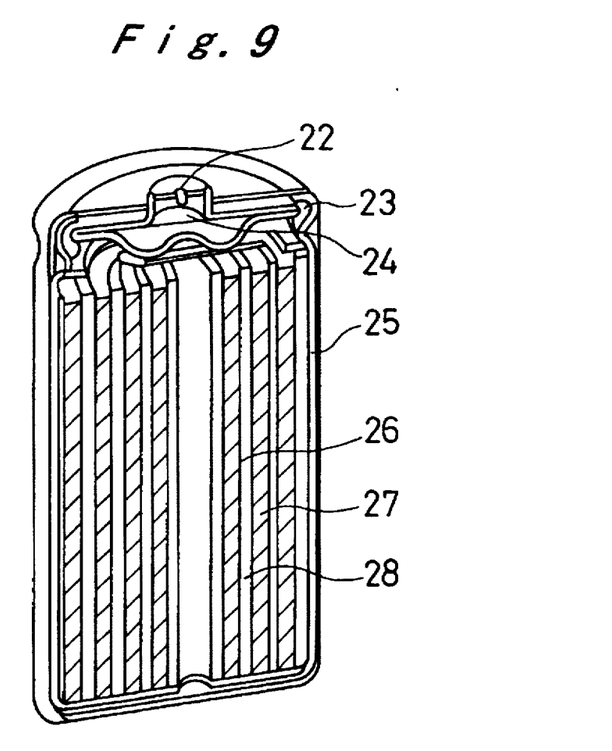
FIG. 9 shows a partially-cross-sectioned perspective view of a cylindrical cell.

A cylindrical cell, whose partially-cross-sectioned perspective view is shown in FIG. 9, was prepared by utilizing the above-prepared electrode sheets. That is, the above positive- electrode sheet 27, a microporous polypropylene film separator 28, the above negative-electrode sheet 26, and a separator 28, were layered together in the stated order and were rolled in a volute fashion. The length of each sheet rolled was 25 cm. The roll was placed in a bottomed cylindrical cell can 25, made of an iron and plated with nickel, which can act as a negative-electrode terminal. Further, 1 mol/liter of $LiPF_6$ (in a solution of 1:1 (v/v) mixture of ethylene carbonate and dimethyl carbonate), as an electrolytic solution, was injected into the cell can. A cell lid 22, having an electrode terminal, was caulked with a gasket 23 interposed, to make a cylindrical cell. Reference numeral 24 represents a safety value. The positive-electrode terminal and the positive sheet 27, and the cell can 25 and the negative sheet 26, were connected respectively through lead terminals previously. The diameter of thus prepared cylindrical cell was 1.4 cm, and the height was 5 cm. Each three cylindrical cells thus made were connected.

EXAMPLE 2

96 Parts of a petroleum coke, as a negative-electrode-active material, and 4 parts of polyvinylidene fluoride, as a binder, were mixed, then N-methylpyrrolidone, as a solvent, was added. The resulting mixture was kneaded, to form a slurry, and the slurry was applied to one surface of a copper foil of thickness 20 μm, and then to the other surface, by using an coating apparatus as shown in FIG. 8 in accordance with the present invention. The space between the slot die outlet and the support was 0.5 mm, the slot clearance was 0.5 mm, the width of the inlet side lip surface and outlet side lip surface was 2 mm, and the transportation speed of the support was 1 m/min. The solid content and the apparent viscosity of the slurry of coating mixture were 50 wt % and 1.5 Pas, respectively. After the coated product was dried by hot-air drying, it was compression-molded by a roller press, to form a negative-electrode sheet of thickness 220 μm. By using the above-prepared negative-electrode sheet and the positive-electrode sheet made in Example 1, cylindrical cells were made in the same manner as that in Example 1, and each two cylindrical cells thus obtained were connected.

EXAMPLE 3

$LiCoO_2$, as a positive-electrode-active material, and acetylene black, as an electrically-conductive agent, were mixed in a ratio of 88 parts to 9 parts; further 3 parts of polyvinylidene fluoride, as a binder, was added, and then N-methylpyrrolidone, as a solvent, was added, with the amount of the N-methylpyrrolidone varied to attain the prescribed solid content. The resulting respective mixtures were kneaded, to prepare electrode material coating solutions having apparent viscosities of 0.05 Pas, 0.5 Pas, 50 Pas, 500 Pas, and 1,000 Pas, respectively, and the solutions were applied using a production steps comprising coating apparatus as shown in FIG. 8. The application was carried out by feeding the solution by a steady-flow pump, with the space between the slot die outlet and the support being 0.5 mm, the slot clearance being 0.7 mm, the width of the lips being 2 mm, and the support transportation speed being 10 m/min, so that the thickness of the coating in the wet state would be 400 μm. With the electrode material coating solutions having apparent viscosities of 0.5 Pas, 50 Pas, and 500 Pas, good smooth surfaces were obtained, but with the electrode material coating solution having an apparent viscosity of 0.05 Pas, sedimentation occurred in the solution well 8 of the slot die 7, the dispersed state was poor, and the discharge of the coating solution from the slot nozzle became nonuniform, so the resulting surface was not smooth. With the electrode material coating solution having an apparent viscosity of 1,000 Pas, uncoated parts (called omission of coating) were formed and a satisfactory smooth surface could not be obtained.

EXAMPLE 4

SnO, as a negative-electrode-active material, acetylene black as an electrically-conductive agent, and graphite were mixed in a ratio of 86:3:6 in term of parts; further 4 parts of polyvinylidene fluoride and 1 part of carboxymethyl cellulose as a binder were added, then water as a solvent was added. The resulting mixture was kneaded and dispersed to prepare negative-electrode material coating solution. Slurry of coating mixture was applied to one surface of a copper foil of thickness 20 μm and then to the other surface, by using an coating apparatus as shown in FIG. 8 in accordance with the present invention. The space between the slot die outlet and support was 0.5 mm, the slot clearance was 0.5 mm, the width of the inlet side lip surface and outlet side lip surface was 3 mm, respectively, and the transportation speed of the support was 1 m/min. The solid content and the apparent viscosity of the slurry of coating mixture were 50 wt % and 3 Pas, respectively. After the coated product was dried by hot-air drying, it was compression-molded by a roller press, to form a negative-electrode sheet of thickness 220 μm. By using the above-prepared negative-electrode sheet and the positive-electrode sheet made in Example 1, cylindrical cells were made in the same manner as that in Example 1, and each two cylindrical cells thus obtained were connected.

EXAMPLE 5

$SiSnO_3$, as a negative-electrode-active material, acetylene black as an electrically-conductive agent, and graphite were mixed in a ratio of 86:3:6 in term of parts; further 4 parts of polyvinylidene fluoride and 1 part of carboxymethyl cellulose as a binder were added, then water as a solvent was added. The resulting mixture was kneaded and dispersed to prepare negative-electrode material coating solution. Slurry of coating mixture was applied to one surface of a copper foil of thickness 20 μm and then to the other surface, by using an coating apparatus as shown in FIG. 8 in accordance with the present invention. The space between the slot die outlet and the support was 0.5 mm, the slot clearance was 0.5 mm, the width of the inlet side lip surface and outlet side lip surface was 3 mm, respectively, and the transportation speed of the support was 1 m/min. The solid content and the apparent viscosity of the slurry of coating mixture were 50 wt % and 2.5 Pas, respectively. After the coated product was dried by hot-air drying, it was compression-molded by a roller press, to form a negative-electrode sheet of thickness 220 μm. By using the above-prepared negative-electrode sheet and the positive-electrode sheet made in Example 1, cylindrical cells were made in the same manner as that in Example 1, and each two cylindrical cells thus obtained were connected.

Comparative Example 1

The same coating solution of positive-electrode mixed composition that was used in Example 1 was applied to one surface of an aluminum foil of thickness 20 μm, and then to the other surface, by using a doctor blade coating method. The transportation speed of the support was 1 m/min. The coated product was dried by hot-air drying, and it was compression-molded by a roller press, to form a positive-electrode sheet of thickness 370 μm.

The same coating solution of negative-electrode mixed composition that was used in Example 1 was applied to one surface of a copper foil of thickness 20 μm, and then to the other surface, in the same manner used for the positive electrode by the doctor blade method. The coated product was dried by hot-air drying, and it was compression-molded by a roller press, to form a negative-electrode sheet of thickness 220 μm.

From the thus made positive-electrode sheet and negative-electrode sheet, cylindrical cells were made in the same manner as in Example 1, and each three such cylindrical cells were connected.

Comparative Example 2

The same coating solution of negative-electrode mixed composition that was used in Example 2 was applied to one surface of a copper foil of thickness 20 μm, and then to the other surface, by using a doctor blade coating method. The transportation speed of the support was 1 m/min. The coated product was dried by hot-air drying, and it was compression-molded by a roller press, to form a negative-electrode sheet of thickness 220 μm. By using, as a positive electrode, the positive electrode made in Comparative Example 1, cylindrical cells were made in the same manner as in Example 2, and each two such cylindrical cells were connected.

Comparative Example 3

The same coating solution of negative-electrode mixed composition that was used in Example 3 was applied to one surface of a copper foil of thickness 20 μm, and then to the other surface, by using a doctor blade coating method. The transportation speed of the support was 1 m/min. The coated product was dried by hot-air drying, and it was compression-molded by a roller press, to form a negative-electrode sheet of thickness 220 μm. By using, as a positive electrode, the positive electrode made in Comparative Example 1, cylindrical cells were made in the same manner as in Example 2, and each two cylindrical cells were connected.

Comparative Example 4

The same coating solution of negative-electrode mixed composition that was used in Example 4 was applied to one surface of a copper foil of thickness 20 μm, and then to the other surface, by using a coating apparatus shown in FIG. 8 by a doctor blade coating method. The transportation speed of the support was 1 m/min. The coated product was dried by hot-air drying, and it was compression-molded by a roller press, to form a negative-electrode sheet of thickness 220 μm. By using, as a positive electrode, the positive electrode made in Comparative Example 1, cylindrical cells were made in the same manner as in Example 2, and each two such cylindrical cells were connected to form.

Electric discharge capacity test of a single cell, and discharge and recharge cycle test of two or more cells connected in series, parallel, or both of them.

The discharge capacity of the above-produced cylindrical single cells was measured under conditions in which the current density was 1 mA/cm$^2$, the final recharge voltage was 4.3 V, and the final discharge voltage was 1.8 V. A discharge and recharge cycle test was carried out for the connected three single cells under conditions in which the final recharge voltage was 12.9 V and the final discharge voltage was 5.4 V, and for the connected two single cells under conditions that the final recharge voltage was 8.6 V and the final discharge voltage was 3.6 V, and the number of cycles until the discharge capacity dropped to 60% of the initial discharge capacity was designated as the cycle life. The results of the test of Examples 1, 2, 3 and 4 are shown in Table 1, and the results of the test of Comparative Examples 1, 2, 3, and 4 are shown in Table 2. Each test was carried out for 50 sets of two or three cells connected in series, parallel, or both of them.

TABLE 1

|  | Scattering of discharge capacities of a single cyclindrical cell* | Cycle life of discharge and recharge cycle of connected two or three cells |
| --- | --- | --- |
| Example 1 | ±2% | 50 times |
| Example 2 | ±2% | 100 times |
| Example 4 | ±2% | 100 times |
| Example 5 | ±2% | 120 times |

Note:
*The values for measuring 50 sets of two or three cells connected in series, parallel, or both of them.

TABLE 2

|  | Scattering of discharge capacities of a single cylindrical cell* | Cycle life of discharge and recharge cycle of connected two or three cells |
| --- | --- | --- |
| Comparative Example 1 | ±6% | 18 times |
| Comparative Example 2 | ±5% | 25 times |
| Comparative Example 3 | ±6% | 32 times |
| Comparative Example 4 | ±5% | 41 times |

Note:
*The values for measuring 50 sets of two or three cells connected in series, parallel, or both of them.

As is apparent from the results of the above Tables 1 and 2, when the production method of the present invention is used, the production fluctuation of the discharge capacity of cylindrical cells can be made small, and in the case of connected multiple cells, the connected multiple cells is hardly overdischarged or overcharged, so that the cycle life of the connected multiple cells can be improved.

Having described our invention as related to the present embodiments, it is our intention that the invention not be limited by any of the details of the description, unless otherwise specified, but rather be construed broadly within its spirit and scope as set out in the accompanying claims.

What we claim is:

1. A method for producing a sheet-like electric cell plate of an electrochemical cell comprising a positive electrode, a negative electrode, and an electrolyte, comprising the step of:

discharging an electrode material coating solution from an outlet of an extrusion-type slot die onto an electrically-conductive support running around a backup roll wherein:

(i) said extrusion-type slot die is positioned in a vertical line through the center of said backup roll;

(ii) a vacuum chamber is provided to seal up space among the slot die and the support;

(iii) the coating solution is discharged from the outlet of the slot die towards the center of the backup roll along said vertical line, so as to vertically coat said coating solution onto said support, (iv) the outlet of the slot die is 0.1 to 3.0 mm from the support; and (v) said electrode material coating solution has a viscosity of from 0.5 to 500 Pas at 25° C., and comprises an electrically-conductive agent and a binder.

2. The method as claimed in claim 1, wherein the outlet of the slot die is 0.3 to 1 mm from the support, and wherein the space between the support and the slot die is filled with said coating solution.

3. The method as claimed in claim 1, wherein the width of the lip surface on the support inlet side of the slot die is from 0.2 to 5 mm and the width of the lip surface on the support outlet side of the slot die is from 0.2 to 5 mm, and wherein the coating solution is discharged from the outlet of the slot die, filling up the space between the support and the slot die with said coating solution.

4. The method as claimed in claim 1, wherein the extrusion-type slot die comprises a slot die having a slot formed by an inlet side lip and an outlet side lip and a coating solution well being in connection with the slot.

5. The method as claimed in claim 4, wherein the slot clearance between the inlet side lip and the outlet side lip is in the range of 0.1 to 2 mm.

6. The method as claimed in claim 4, wherein the width of the lip surface of the inlet side lip or the outlet side lip is in the range of 0.2 to 5 mm.

7. The method as claimed in claim 1, wherein the electrically-conductive support is selected from the group consisting of metallic foils and electrically-conductive films of an inorganic oxide, an organic polymer, or carbon.

8. The method as claimed in claim 1, wherein the transportation speed of the support is in the range of 0.1 to 100 m/min.

9. The method as claimed in claim 1, wherein the coating thickness of the electrode material coating solution is in the range of 10 to 2,000 µm in terms of the wet state before drying.

10. The method as claimed in claim 1, wherein the coating thickness of the electrode material coating solution after drying is in the range of 5 to 1,800 µm.

11. The method as claimed in claim 1, wherein said electrode material coating solution further comprises an electrode-active material and a solvent.

12. The method as claimed in claim 11, wherein the electrode-active material is selected from the group consisting of compounds that can insert and/or release $H^+$, $Li^+$, $Na^+$, or $K^+$.

13. The method as claimed in claim 11, wherein the solvent is selected from the group consisting of water, at least one of organic solvents, and a mixture thereof.

14. The method as claimed in claim 1, wherein the binder is selected form the group consisting of polysaccharides, thermoplastic resins, polymers having rubber elasticity, and a mixture thereof.

15. The method as claimed in claim 1, wherein the electrically-conductive agent is selected from the group consisting of natural graphite, artificial graphite, carbon black, acetylene black, Ketjen black, carbon fiber, a metal powder, a metal fiber, and a polyphenylene derivative or a mixture thereof.

16. A method for producing a sheet-like electric cell plate of an electrochemical cell comprising a positive electrode, a negative electrode, and an electrolyte, comprising the step of:

discharging an electrode material coating solution from an outlet of an extrusion-type slot die onto an electrically-conductive support running around a backup roll, wherein:

(i) said extrusion-type slot die is positioned in a vertical line through the center of said backup roll;

(ii) the coating solution is discharged from the outlet of the slot die towards the center of the backup roll along said vertical line;

(iii) the space between the support and the slot die is filled with said coating solution so as to vertically coat said coating solution onto said support;

(iv) the outlet of the slot die is 0.1 to 3.0 mm from the support; and (v) said electrode material coating solution has a viscosity of from 0.5 to 500 Pas at 25° C., and comprises an electrically-conductive agent and a binder.

17. The method as claimed in claim 16, wherein the width of the lip surface on the support inlet side of the slot die is from 0.2 to 5 mm, and the width of the lip surface on the support outlet side of the slot die is from 0.2 to 5 mm.

18. The method as claimed in claim 16, wherein the outlet of the slot die is 0.3 to 1 mm from the support.

\* \* \* \* \*